UNITED STATES PATENT OFFICE.

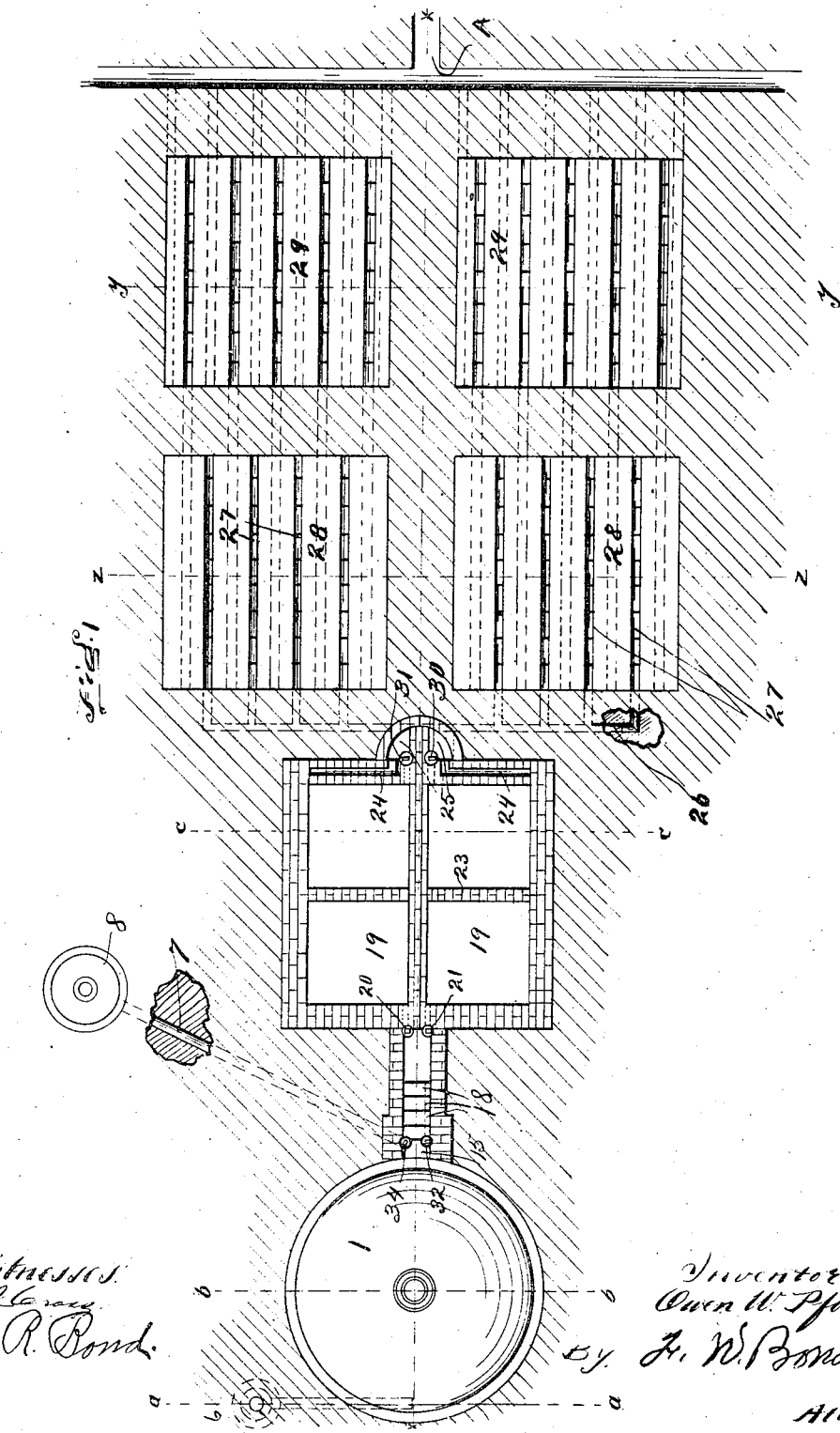

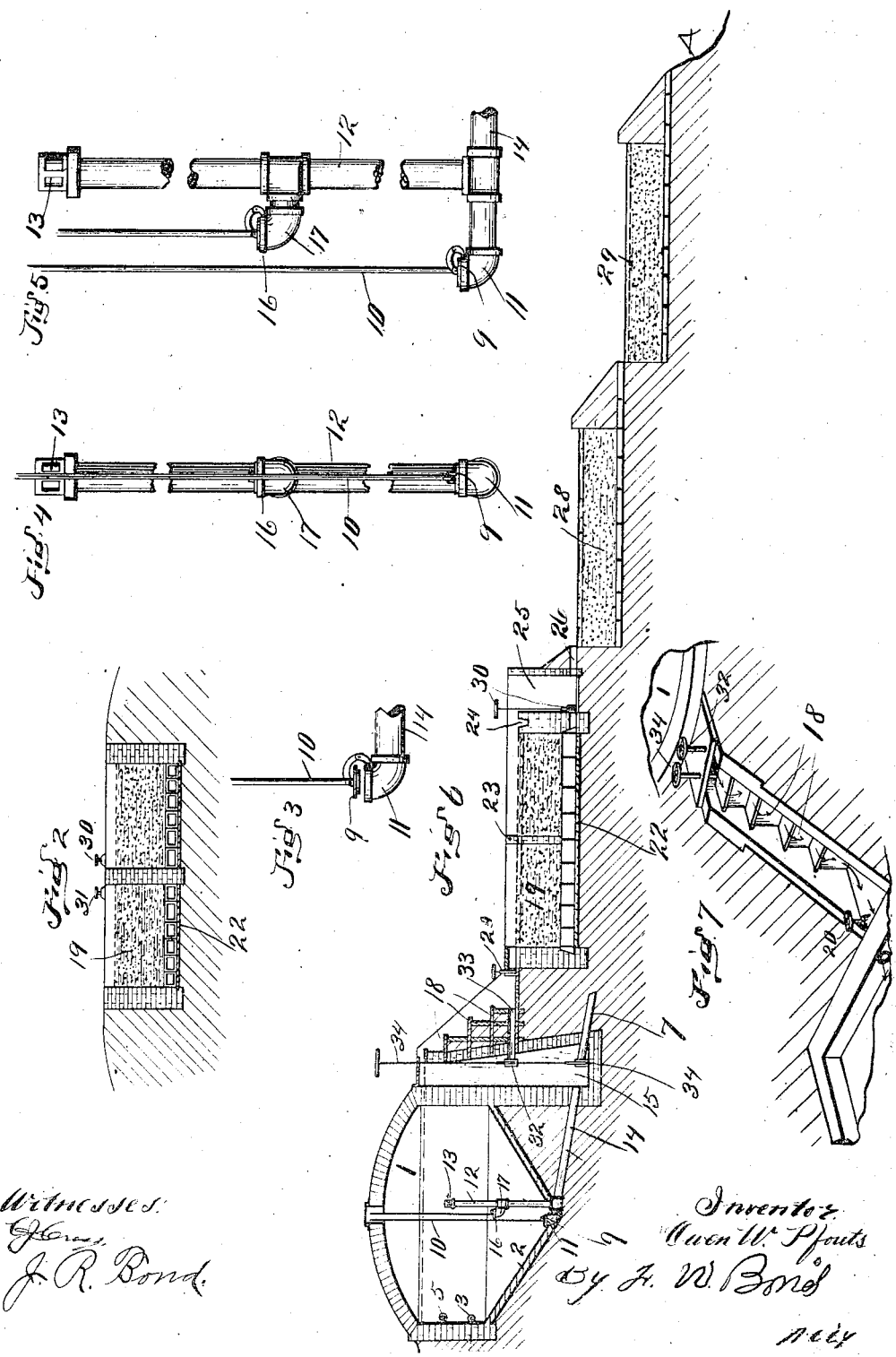

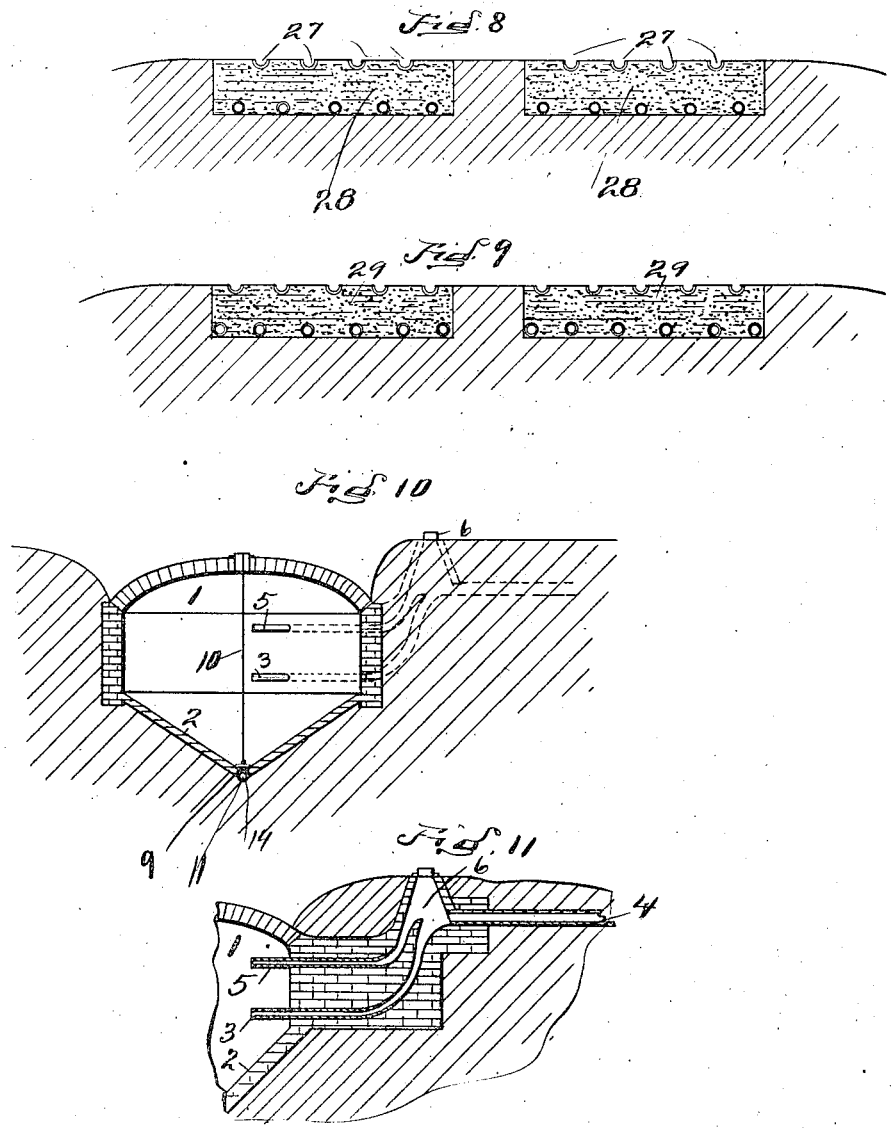

OWEN W. PFOUTS, OF ALLIANCE, OHIO.

PURIFICATION OF SEWAGE.

SPECIFICATION forming part of Letters Patent No. 659,452, dated October 9, 1900.

Application filed November 27, 1899. Serial No. 738,363. (No model.)

*To all whom it may concern:*

Be it known that I, OWEN W. PFOUTS, a citizen of the United States, residing at Alliance, in the county of Stark and State of Ohio, have invented certain new and useful Improvements in the Purification and Disposal of Sewage; and I do hereby declare that the following is a full, clear, and exact description of the same, reference being had to the annexed drawings, making a part of this specification, and to the characters of reference marked thereon, in which—

Figure 1 is a top view. Fig. 2 is a transverse section on line $c\ c$, Fig. 1. Fig. 3 is an enlarged view of one of the lower valves. Fig. 4 is an edge view of the outlet-pipe. Fig. 5 is a side view of the outlet-pipe, showing the connections belonging thereto and valve. Fig. 6 is a longitudinal section on line $x\ x$, Fig. 1. Fig. 7 is a perspective view showing a portion of the septic-tank and aeration steps or falls. Fig. 8 is a transverse section on line $z\ z$, Fig. 1. Fig. 9 is a transverse section on line $y\ y$, Fig. 1. Fig. 10 is a section on line $b\ b$, Fig. 1. Fig. 11 is a section on line $a\ a$, Fig. 1.

The present invention has relation to the purification and disposal of sewage; and it consists in the novel construction and arrangement hereinafter described, and particularly pointed out in the claims.

Similar characters of reference indicate corresponding parts in all the figures of the drawings.

In the accompanying drawings, 1 represents the septic or receiving tank, which is preferably formed circular and of any size, reference being had to the amount of sewage to be operated upon. The bottom 2 of the septic-tank 1 is concaved, the lowest point of said bottom being located at or about the vertical center of said tank and is so located for the purpose of bringing the sediment toward the center of said tank.

For the purpose of giving the contents of the septic-tank a whirling or rotary motion the delivery end of the inlet-pipe 3 is located at one side of the vertical center and adjacent to the inner periphery or wall of said septic-tank.

For the purpose of causing the sewage to enter the septic-tank with force the inlet-pipe 3 is reduced in size, by which arrangement a sufficient amount of back force will be produced to give the desired amount of pressure to the sewage.

The main inlet-pipe 4 is formed of larger diameter than that of the pipe 3, said pipe being connected in the ordinary manner at its outer end or connection.

For the purpose of providing for conveying the full capacity of the inlet-pipe 4 to the septic-tank 1 the overflow-pipe 5 is provided, by which arrangement there will be no back pressure in the pipe 4.

In the drawings I have shown one overflow-pipe; but it will be understood that more than one may be provided, if desired, as the only object designed is to provide sufficient capacity to carry or convey all of the sewage at all times.

By imparting rotary movement to the contents of the septic-tank 1 the heavier and more solid material or, in other words, the sludge will settle toward and onto the concave bottom 2, finding its way to the lowest point on said bottom.

For the purpose of conveying the sludge from the sedimentation-chamber 15' to the well 8 the pipe 7 is provided, which pipe leads from the bottom of the chamber 15 to said sludge-well, which well may be located at any desired point, reference being had to the proper conveyance of the sludge.

For the purpose of removing the accumulation of the sludge or for any other purpose a valve, such as 9, is provided, which valve is to be operated by a suitable rod 10, it of course being understood that the valve 9 is to be provided with a suitable valve-seat, formed upon the upper end of the elbow 11 or its equivalent.

Within the septic-tank 1 is located the vertical outlet-pipe 12, said outlet-pipe being provided at its top end or portion with the apertures or openings 13, said openings being preferably arranged as illustrated in Figs. 4, 5, and 6.

For the purpose of removing the sewage from the septic-tank 1 at a point between the top and bottom of the sewage the outlet-pipe 12 is formed of such a height that its upper end will be below the upper sewage-line, or, in other words, below the top of the sewage.

It will be understood that the outlet-pipe 12 should be formed of such a size that it will provide an outlet of about the same capacity as that of the inlet-pipe 3, by which arrangement the amount of sewage will remain about the same at all times.

At the bottom or lower end of the vertical outlet-pipe 12 is connected the pipe 14, which pipe leads to the bottom or lower portion of the sedimentation-chamber 15.

When it is desired to remove the sewage from the septic-tank at a point below the top or upper end of the outlet-pipe 12, the valve 16 is opened, thereby allowing the sewage to be removed to a point level with the valve 16, said valve being located upon the top or upper end of the elbow 17, said elbow being connected to the vertical feed-pipe 12 at or about midway between its top and lower end, substantially as illustrated in Fig. 6. It will be understood that the sewage will find the water-line with the septic-tank 1, and at or about the normal water-line of said tank and to one side of the sedimentation-chamber are located or formed the aeration steps or falls 18, said falls being located and arranged substantially as shown in the drawings. When the sewage has passed over the falls 18, it is conveyed to the oxidizing-tank 19 through the valves 20 and 21. One of said valves may be closed, thereby conveying all of the sewage to one of the oxidizing-tanks 19, or both valves may be open, as desired, this being simply a question of judgment. The floor of the oxidizing-tank 19 is composed of hollow building-blocks placed in position with loose joints and on the top of the cement bottom 22. The oxidizing-tank 19 is provided with a transverse partition 23, which partition extends from the top of the hollow floor, said hollow floor passing under the partition, as illustrated in Fig. 6. It will be understood that as the sewage enters the oxidizing-tank it will pass downward and find its way into the hollow floor or building-blocks and from thence under the partition 23 and upward upon the opposite side of the partition 23 and thence into the channel 24, said channel being located upon the top of the oxidizing-tank 19 at its outer or delivery end, from whence it falls into the receptacle 25, and from said receptacle it is conveyed through the pipe 26 and onto the trough-tiles 27, which trough-tiles are formed in sections and the sections loosely joined together, said trough-tiles being located on the top of the filtering material located in the sand filters 28, which operation is continued through filters 29, two filters being shown; but it will be understood that any desired number may be employed to produce proper filtration.

The oxidizing-tank 19 should be filled with coarse cinders, coke, or coarse gravel or any like material, as it will be understood that the material used to fill the oxidizing-tank should be coarse, so that the spaces between the material used to fill the oxidizing-tank will be of sufficient capacity to allow the sewage to freely pass down and up through the oxidizing-tank 19.

When it is desired to remove the sewage from the oxidizing-tank 19 and oxidize the organic material adhering to the filtering material, the valves 20 and 21 are closed or one of said valves closed, reference being had to the tank desired to be operated upon, and the outlet-valves 30 and 31 opened, it being understood that if the valve 21 is closed then valve 30 is to be open, by which arrangement all of the liquid is conveyed through the hollow floor and to the chamber 25 and thence through the pipes 26 and 27 and onto the filters 28 and 29.

In the drawings I have shown two sets of oxidizing tanks and filters and the necessary pipes and valves belonging thereto, which may be used alternately, if desired. It will be understood that any desired number of oxidizing-tanks and filters may be located side by side as the two are arranged.

When it is desired to empty and clean the septic and sedimentation tanks, the valve 32 is open and valve 16 is raised or opened, at which time the water from the septic-tank is conveyed into the sedimentation-tank and through the pipe 33 and on to the oxidizing-tanks and thence through the filters.

When it is desired to remove the sludge from the septic-tank and the sedimentation-tank, the valves 9 and 34 are open, thereby allowing the sludge to pass through the pipe 7 and be conveyed to the sludge-well 8 or any other desired point.

It will be understood that by providing the open tiles 27 and loosely connecting them together and locating said tile upon the top or upper side of the filters the sewage will be distributed over said filters, thereby causing the sewage to become distributed, thereby producing a better filtration.

It will be understood that more than one inlet-pipe, such as 3, may be employed, and they may be located upon opposite sides of the septic-tank, it being understood that the flow of sewage should be in opposite directions, if in the event inlet-pipes are located upon opposite sides, by which arrangement the circular motion given to the sewage will not be counterbalanced. It will also be understood that after the sewage has been passed through the oxidizing-tanks and filtered it is to be conveyed in any well-known manner to a suitable watercourse, such as A.

Having fully described my invention, what I claim as new, and desire to secure by Letters Patent, is—

1. The combination of a septic-tank having the inlet-pipe located to one side of the vertical center and adjacent to the inner periphery of said tank, and said tank provided with a concave bottom; a vertical outlet-pipe centrally located within the septic-tank, a sedimentation-tank located at one side of the septic-tank, a pipe communicating with the vertical outlet-pipe and said sedimentation-tank, steps located upon the outer side of said sedimentation-tank, an oxidizing-tank provided with a hollow floor or floors and provided with a partition or partitions, a channel located at the outer or delivery end of the oxidizing tank or tanks, a chamber 25 and pipes leading from said chamber and filters provided with open tiles, substantially as and for the purpose specified.

2. The combination of a septic-tank provided with an inlet-pipe, an outlet-pipe having apertures at its upper end, a valve located between the top and lower ends of said outlet-pipe, a sedimentation-tank and a pipe connected with the vertical outlet-pipe, and said sedimentation-tank, a valve or valves located between the bottom and top of said sedimentation-tank, a pipe leading from the sedimentation-tank and a valve or valves located between the oxidizing-tank and sedimentation-tank, and a sedimentation-tank, substantially as and for the purpose specified.

3. The herein-described means for the purification and disposal of sewage, consisting of the combination of a septic-tank, a sedimentation-tank, communication between said septic-tank and sedimentation-tank, steps or falls located upon one side of the sedimentation-tank, an oxidizing-tank provided with a hollow floor, a partition located above the hollow floor and means for conveying sewage from the oxidizing-tank to the filter or filters, substantially as and for the purpose specified.

4. The combination of a septic-tank, a sewage-pipe leading into said septic-tank at one side of the vertical center thereof, an outlet-pipe, a valve located at the bottom of the septic-tank and at the side of the vertical outlet-pipe, a sedimentation-tank, a sludge-pipe communicating with the septic-tank and sedimentation-tank, and a sludge-pipe leading from the sedimentation-tank to a sludge-well, and the valve 34, substantially as and for the purpose specified.

5. The combination of a septic-tank, a sedimentation-tank, means for conveying sewage and sludge from the septic-tank to the sedimentation-tank, an oxidizing-tank provided with a hollow floor and a partition located above the hollow floor, filters and means for conveying sewage from the oxidizing-tank to the filter-beds, substantially as and for the purpose specified.

6. The combination of an oxidizing-tank provided with a partition, a hollow floor extended under the partition and means for conveying sewage therefrom to filters, substantially as and for the purpose specified.

7. The combination of filters, sewage-receiving troughs provided with loose joints and the troughs located upon the top of the filters, substantially as and for the purpose specified.

8. In a sewage-disposal system, a septic-tank, a sewage pipe or pipes leading into said septic-tank at a point or points at one side of the diameter of said septic-tank whereby a rotary motion is imparted automatically to the sewage and a vertical pipe centrally located in the septic-tank, substantially as and for the purpose specified.

In testimony that I claim the above I have hereunto subscribed my name in the presence of two witnesses.

OWEN W. PFOUTS.

Witnesses:
J. R. BOND,
F. W. BOND.